United States Patent
Kalaldeh et al.

(10) Patent No.: US 8,723,791 B2
(45) Date of Patent: May 13, 2014

(54) PROCESSOR CONTROL AND DISPLAY SYSTEM

(75) Inventors: Khaled A Kalaldeh, Dubai Media City (AE); Tawfeeq A Saad Eddin, Dubai Media City (AE)

(73) Assignee: Ketab Technologies Limited, Labuan (MY)

(*) Notice: Subject to any disclaimer, the term of this patent is extended or adjusted under 35 U.S.C. 154(b) by 584 days.

(21) Appl. No.: 12/314,707

(22) Filed: Dec. 15, 2008

(65) Prior Publication Data

US 2009/0213070 A1 Aug. 27, 2009

Related U.S. Application Data

(63) Continuation-in-part of application No. PCT/IB2007/052299, filed on Jun. 15, 2007.

(60) Provisional application No. 60/804,969, filed on Jun. 16, 2006.

(51) Int. Cl.
*G06F 3/033* (2013.01)
*G09G 5/08* (2006.01)

(52) U.S. Cl.
USPC ........... 345/157; 345/173; 345/174; 345/156; 382/103; 235/494; 434/314; 434/379; 349/5

(58) Field of Classification Search
USPC .......... 345/156–158, 173–179; 382/100, 159, 382/103, 109, 187; 325/462.45, 494; 434/317, 314, 379, 365; 349/5
See application file for complete search history.

(56) References Cited

U.S. PATENT DOCUMENTS

| | | | |
|---|---|---|---|
| 6,367,183 B1* | 4/2002 | Haber | 40/594 |
| 6,469,685 B1* | 10/2002 | Woodruff et al. | 345/60 |
| 6,870,670 B2* | 3/2005 | Gehring et al. | 359/443 |
| 7,176,896 B1* | 2/2007 | Fahraeus et al. | 345/173 |
| 2002/0044134 A1* | 4/2002 | Ericson et al. | 345/163 |
| 2003/0231219 A1* | 12/2003 | Leung | 345/863 |
| 2004/0140964 A1* | 7/2004 | Wang et al. | 345/179 |
| 2005/0030486 A1* | 2/2005 | Lee et al. | 353/69 |
| 2005/0083301 A1* | 4/2005 | Tamura | 345/158 |
| 2005/0179538 A1* | 8/2005 | Morita et al. | 340/539.1 |
| 2006/0127872 A1* | 6/2006 | Marggraff | 434/353 |

(Continued)

OTHER PUBLICATIONS

Fahraeus Christer et. al. "System and Devices for Electronic Recording of Handwritten Information" WO 01/16872, Mar. 8, 2001.*

*Primary Examiner* — Lun-Yi Lao
*Assistant Examiner* — Md Saiful A Siddiqui
(74) *Attorney, Agent, or Firm* — The Ruble Law Firm, P.C.

(57) ABSTRACT

The present disclosure describes an interactive display system, method and computer readable medium. In one embodiment, an interactive display surface having one or more computer generated patterns printed thereon may be utilized in conjunction with an electronic pen in order to identify the absolute position of the pen relative to the interactive display surface. In one embodiment, the absolute position of the electronic pen may be transmitted to a computer system and utilized to control one or more programs running on the computer system. In one embodiment, the visual output of the computer system may be superimposed upon the interactive display surface using one or more projectors. The computer generated patterns may have a predefined association with a control operation of the computer system such that placing the electronic pen in proximity to the associated generated pattern causes the computer system to automatically execute the associated control operation.

13 Claims, 15 Drawing Sheets

(56) References Cited

U.S. PATENT DOCUMENTS

2007/0121102 A1* 5/2007 Marcu .................. 356/152.1
2009/0309839 A1 12/2009 Hildebrandt et al.
2009/0309854 A1 12/2009 Hildebrandt et al.
2010/0247790 A1 9/2010 Gypen

* cited by examiner

PROCESSOR CONTROL AND DISPLAY SYSTEM

CROSS REFERENCE TO RELATED APPLICATIONS

This application is the Continuation-In-Part application of International Application No. PCT/IB2007/052299, filed 15 Jun. 2007, which designated the U.S. and claims the benefit of U.S. Provisional Application No. 60/804,969, filed 16 Jun. 2006, the entire contents of each of which are hereby incorporated by reference.

This application claims priority from provisional application No. U.S. 60/804,969 filed on 16 Jun. 2006, the entire contents of which are hereby incorporated by reference.

BACKGROUND OF THE INVENTION

Field of the Invention

This disclosure relates to the field of micro-processor based interactive display systems, and more particularly, but not exclusively to such systems which utilize position coded patterns and position sensing devices in association with projection based display apparatus to facilitate user interaction with computer based applications and programs.

'Whiteboards' have become commonplace visual communication aids which may be found in school classrooms, presentation theaters and work places. Standard whiteboards may comprise a rigid surface which is readily available for writing on with erasable marker pens termed 'dry-wipe' markers.

In recent years, the introduction of so called 'interactive whiteboards' has provided a link between the visual based presentation of information using the standard whiteboard and the functionality of the ubiquitous personal computer. Consequently, interactive whiteboards are the natural successors to standard whiteboards and can provide a powerful communication tool which can serve as a gateway for any environment, including the workplace and also for learning ecosystems worldwide known as e-learning in which digital mediums are heavily employed for enhanced learning and communication.

FIG. 1 illustrates the concept of an interactive whiteboard whereby a projection screen combined with spatial interaction becomes an interactive whiteboard when operating with a projector.

Existing state of the art interactive whiteboard display systems make use of a specially manufactured surface which acts as the means for detecting the position of special interactive whiteboard pens, erasers, stylus, pointers and associated visual presentation aid tools (collectively referred to hereinafter as 'interactive whiteboard pens'), which may be used in association with an interactive whiteboard for instructing, presenting; teaching, writing, pointing, selecting, activating and drawing.

Due to the 'interactive whiteboard pen' position sensing technology employed in state of the art interactive whiteboard systems, they may be referred to generally in the art as 'touch based,' and may include a display or screen arrangement having a touch sensitive surface on which contacts are made using an interactive whiteboard pen.

A projector arrangement may be connected to a host personal computer ('PC') and used to project an image taken from a program running on the host PC, thereafter the interaction between the inputs and movements made using the interactive whiteboard pen and the PC may be conducted via connection between the interactive whiteboard itself and the PC. Such connections can include direct cable and wireless communication means.

The special construction and surface of the interactive whiteboard ultimately provides the link between the relative movements of an interactive whiteboard pen and the associated functions which are to be controlled or activated on the dedicated host personal computer ('PC').

Pointer contact with such a touch surface may be detected and used to generate corresponding output depending on areas of the touch surface where the contacts are made. It is this surface based coordinate-detecting technology that characterizes the functionality of state of the art an interactive whiteboard systems and inherently dictates their physical and functional limitations.

Such state of the art interactive whiteboard surfaces may utilize analog resistive, electromagnetic, capacitive, acoustic or machine vision properties to identify the relative position of contact of the interactive whiteboard pen on the surface of the whiteboard, and thereafter the required positional information may be transmitted to the host PC thereby providing the required association between an image projected from the host PC on to the surface of the interactive whiteboard and the function or functions associated with the interactive whiteboard pen (i.e., color, erasing capacity, selection of particular icon based functions, etc).

Consequently, due to the available technology employed in state of the art systems, the associated physical dimensions of interactive whiteboards such as that offered in the market under the trademark Smartboard™, can reach circa 30 mm in thickness, and in addition require dedicated interactive whiteboard pens to provide the functionality required to represent different colors when writing 'electronically' on the interactive whiteboard surface.

The physical limitations of state of the art interactive whiteboard systems relate to the specific requirement to use a dedicated interactive whiteboard display surface which is typically required to be fixed to a solid wall or other surface (i.e., presentation theater, etc), or alternately mounted on a moveable frame system for transportation between classrooms or offices, etc.

Consequently, by their very nature, such systems are not readily moveable or transportable due to the weight and physical size associated with the pointer detection technology comprised therein.

Other limitations evident with state of the art interactive whiteboard systems relate to the requirement to use front illumination based methods to project images onto the surface of the whiteboard due to the thickness and non-transparent nature of the surface based sensing technology comprising the underlying pointer detection apparatus. This limitation thereby introduces the possibility of shadows being cast across the projected image on the interactive whiteboard surface by those using the system.

Hand writing may be digitally stored in a computer via special pens that transcribe hand motion, usually called automatic transcription, and the resulting image transferred into the computer for handwriting recognition and archiving applications.

This functionality may be achieved using enabling technologies comprised in a holding, writing and pointing pen arrangement (hereinafter referred to as 'electronic pens'), in which displacement of the electronic pen tip is detected and measured accordingly. The enabling technologies utilized in state of the art 'electronic pens' for detecting and measuring pen movement include, but are not limited to, mechanical accelerometers, gyroscopes and optical pattern recognition apparatus and ultrasound transducers, all configured to detect displacement of the electronic pen, and typically the tip of said pen.

Technology employed for the automatic recognition and computer based storage of handwriting may utilize a special pen equipped with a vision based sensor, and paper typically known in the art as 'digital paper,' the surface of which is covered with a position coded pattern (hereinafter referred to as a 'PCP'), that can provide unique respective (x, y) positions on the paper. When an electronic pen equipped with such a vision based sensor and a processor passes above such paper, a processor means may be utilized to decode the captured image of the pattern on the paper, and thereafter the associated system can determine the resulting coordinates, translate them into a specific location in an electronic document via the transmission of data to a computer via a wireless or wired connection.

SUMMARY OF THE INVENTION

The present disclosure provides for a novel interactive whiteboard system utilizing an electronic reading pen to interact with a host PC via an image from the host PC projected onto any surface, the surface may include a position coded pattern to provide specific location information and an associated host PC for providing information relating to the position of the electronic reading pen relative to the projected image.

According to a first aspect of the invention claimed herein there is provided a method of controlling an interactive projection display system provided with a processor, comprising the use of an electronic reading pen in conjunction with position coded pattern surface technology.

In one embodiment, the invention described herein enables a user to view the image of a host computer screen projected onto any surface comprising a position coded pattern (PCP), and thereafter to interact with the various functions and programs available and on the host computer via the use of an 'electronic reading pen' by using said pen in the manner of a touch screen device on the PCP surface onto which said image is projected.

Accordingly, in one embodiment, a desktop icon projected from a host PC onto a PCP surface can thereafter be selected by using an 'electronic reading pen,' and the particular functions or programs associated with the icon on the computer screen can be selected and ultimately activated. By utilizing this novel functionality, a multitude of computer applications can be opened and manipulated via the interaction of an electronic reading pen with any surface comprising a PCP.

The application software in the personal computer may be designed to interpret and perform operations in accordance with inputs received from the electronic pen and accordingly the action of pointing and/or touching the electronic reading pen on the PCP display surface, the host personal computer can be controlled to perform all of its operational functions, including but not limited to opening and display menus, activating programs, dragging icons, writing, executing, operating and interacting with software.

In one embodiment, the present invention may utilize an electronic reading pen, and a PCP (position coded pattern) projection surface which can be fixedly or releasably attached onto a surface such as a wall, board, whiteboard or other suitable screen arrangement. The electronic reading pen may comprise a position decoding device in association with other functional elements and embodiments, a camera arrangement such a CCD device or any other visual recognition means capable of recognizing the PCP employed, and an embedded processor capable of interpreting the PCP beneath the pen head when the projection surface is at a finite distance from the engaging head.

The PCP surface may be comprised of a suitably durable projection material capable of conveying information about a unique position encoded in the printed pattern, of which the recognition, interpretation, processing and subsequent transmission to a host PC may be carried out by the systems onboard the electronic reading pen.

Accordingly the actual tip position of an electronic pen on, or over, a PCP display surface can be established by an electronic recording pen in accordance with the invention. The relative (x,y) coordinates of said tip can thereby be established with reference to the display image on the host computer, and thereafter the electronic reading pen can be used to interact with projected images provided by said host computer.

To acquire the pen tip position from the PCP surface, it is appreciated that when the pen tip touches the said surface such event enables a special sensing device such as infrared charge-coupled device camera (CCD) in the pen head to read the PCP surface for subsequent interpretation.

An electronic recording pen in accordance with the invention may be equipped with a real-time processor to decode the information contained in the PCP surface pattern to establish sets of predetermined (x, y) coordinates embedded within the pattern itself.

Thereafter, a real-time processor works simultaneously to decode the (x, y) coordinates which are sent via wireless communication or the like to a host PC which may be attached to a projector.

To facilitate the coordination and calibration of the projected image with that of the image displayed in the host PC, when operating an interactive whiteboard system in accordance with the invention, a user may be required to point to, and touch the electronic recording pen on to predetermined points on the PCP display surface. These actions provide for the calibration of the relative coordinates of the image projected on the PCP display surface with that of the image on the host PC to ensure that the dimensions and scale of projected image are in proportion to the image on the associated host PC screen and are thereby understood by the electronic recording pen to host PC interface program. Any suitable position dependent automatic transcription technology may be utilized by the system.

After proper calibration the electronic recording pen-to-PCP system operation will indicate the exact position as the electronic recording pen-tip position on the projected view on surface to be the same as that of the mouse cursor on the host PC display screen.

According to a further embodiment of the invention, there is provided an interactive projection system that can be produced by printing a position-coded pattern on a suitable projection substrate.

An object of the present invention is to provide an interactive projection system for transforming PCP projection surface locations into interactive areas with an electronic reading pen.

Another object is to provide an interactive projection system that provides an interactive projection surface to work in conjunction with a projector.

An object of the present invention is to provide an interactive projection system that has a projection surface that is easily manufactured with regular wide-format printers or other printing facilities.

An object of the present invention is to provide an interactive projection system that utilizes the streaming of real-time wireless location data via an electronic reading pen.

Another object is to provide an interactive projection system that is capable of transforming various sizes, styles and types of surfaces/display screens into interactive facades.

Another object of the invention is the provision of an interactive projection system that employs physical shortcuts that can be used to have access computer applications via the use of PCP media separate from the PCP display arrangement for which functions on the host PC have been pre-assigned.

Another object is to provide an interactive projection system that is lightweight, portable and compact by comparison to known interactive whiteboard display systems.

Another object is to provide an interactive projection system that does not interfere with rear projection light due to the possibility to utilize a transparent PCP substrate.

Another object is to provide an interactive touch screen that does utilizes a transparent PCP surface and an invisible pattern like UV or other invisible ink type.

Another object is to provide a wireless mouse pad comprised only of a regular size mouse pad have PCP on its surface and functions with an electronic reading pen.

Another object is to provide an interactive projection system that may be utilized as a sticker roll or as a rigid projection surface and may be provided with a releasable contact medium such as adhesive tape or glue, magnets, fastening surfaces such as Velcro™ and the like.

Another object is to provide an interactive projection system that is lightweight. Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated.

There has thus been outlined, rather broadly, the more important features of the invention in order that the detailed description thereof may be better understood, and in order that the present contribution to the art may be better appreciated.

There are additional features of the invention that will be described hereinafter. It is to be noted that the invention hereto presented substantially departs from used technologies to achieve required interactivity.

It is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

Various other objects, features and attendant advantages of the present invention will become fully appreciated as the same becomes better understood when considered in conjunction with the accompanying drawings, in which like reference characters designate the same or similar parts throughout the several views, and wherein:

In one embodiment of the invention, an interactive display system is provided which comprises a PCP projection surface and an electronic reading pen capable of reading the PCP from the display screen.

DETAIL DISCUSSION OF THE EMBODIMENTS

The projection surface is comprised of a suitable projection material capable of displaying the projector images when a projector is placed at suitable distance away from the screen.

The electronic reading pen comprises a CCD infrared camera that can capture details of the PCP at up to 70 frames/second. Thereafter the electronic reading pen is capable of passing image shots to a decoding processor inside the pen that decodes the pattern image information and outputs absolute (x, y) position data, that is without a (0, 0) reference relevant to the image the pen camera is observing from the pattern.

Figure 1:
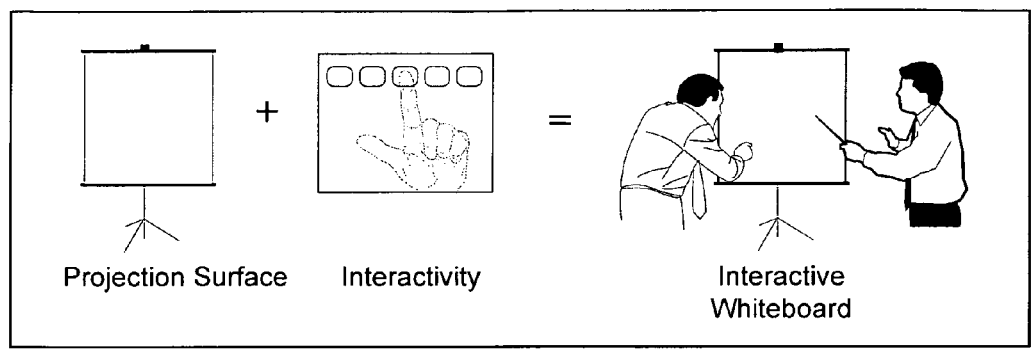
FIG. 1 is an explanatory diagram of the concept of interactive whiteboards.
Figure 2:
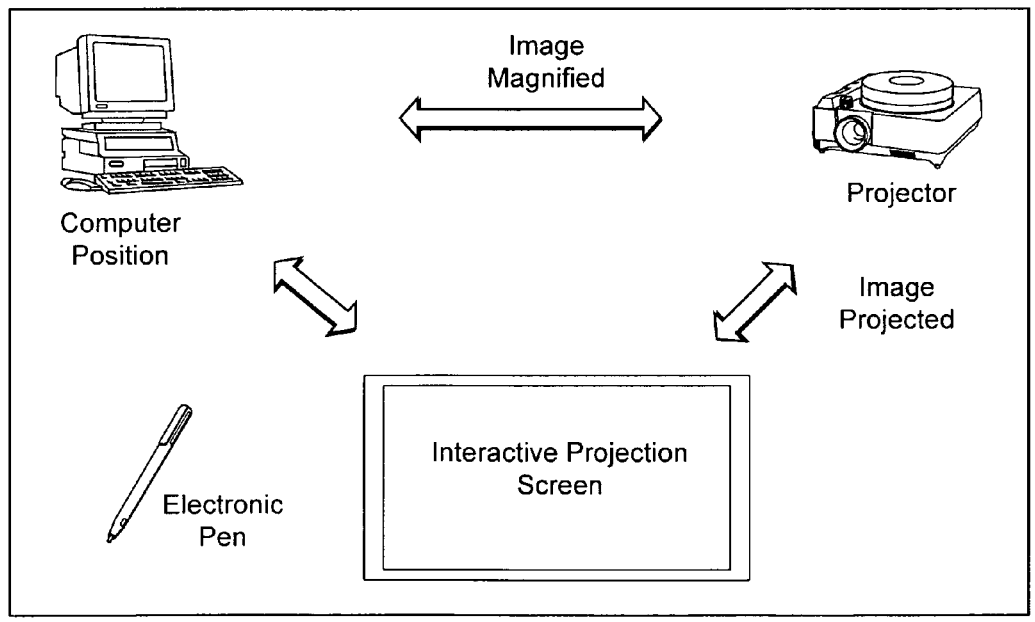
FIG. 2 is a workflow diagram illustrating the operation of interactive whiteboards.
Figure 3A:
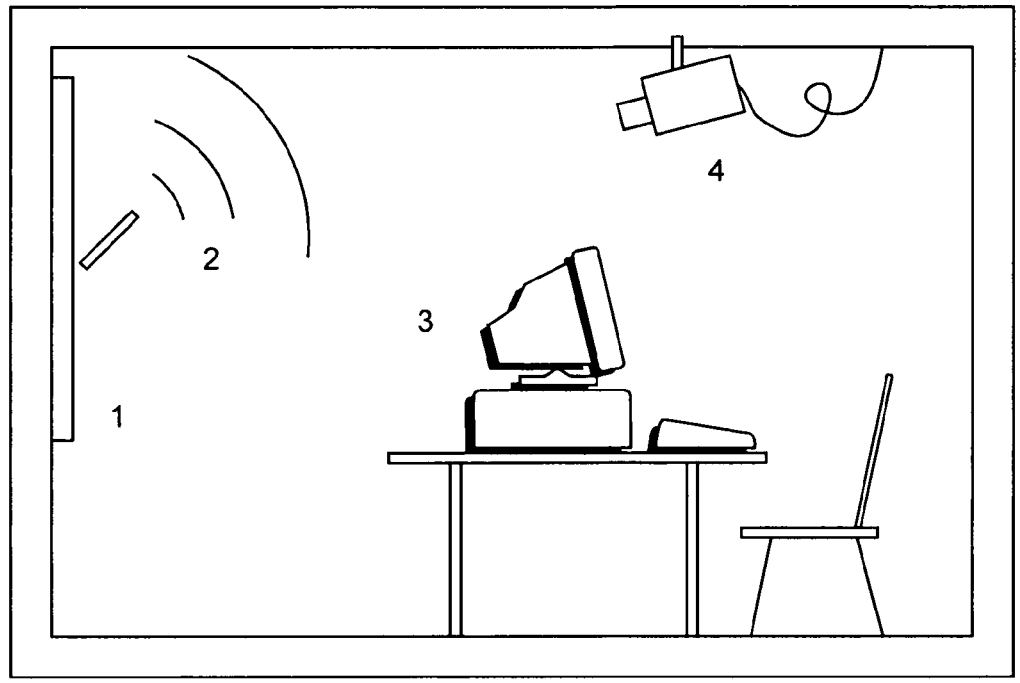
FIG. 3A is a side view of an example classroom operation setup in front projection mode.
Figure 3B:
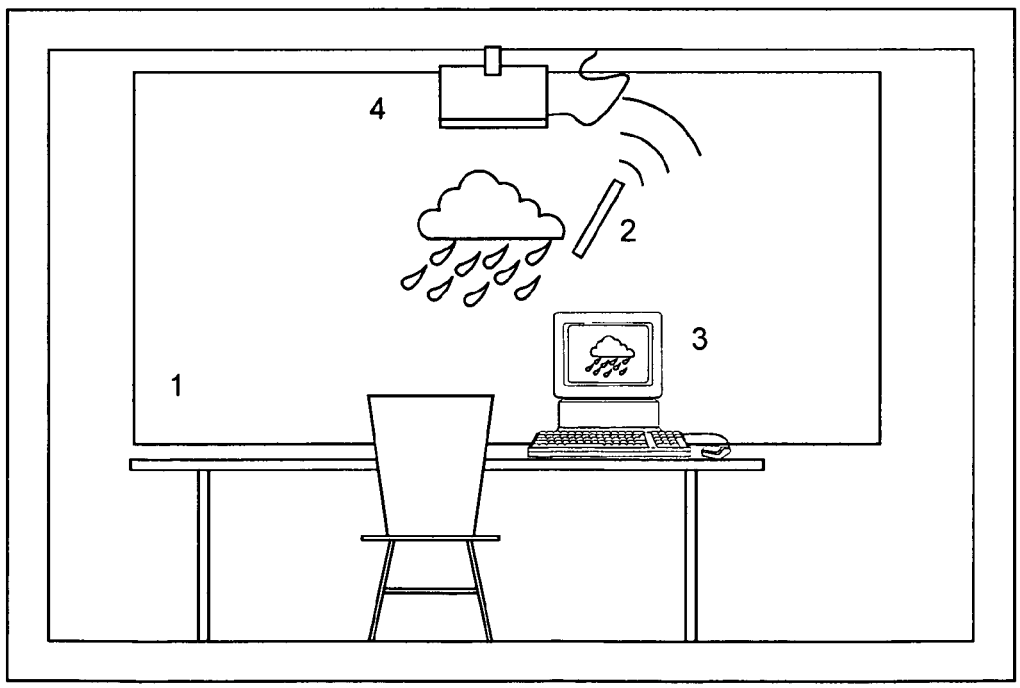
FIG. 3B is a front view of an example classroom operation setup in front projection mode.

When using a front projection interactive whiteboard display system in accordance with the invention, a typical setup is shown at FIGS. 3A and 3B. Such a setup would typically comprise a host PC for controlling the display process and operating applications and a front projector for projecting images from the host PC to the PCP encoded display screen with which the user will interact using an electronic reading pen.

Figure 4A:
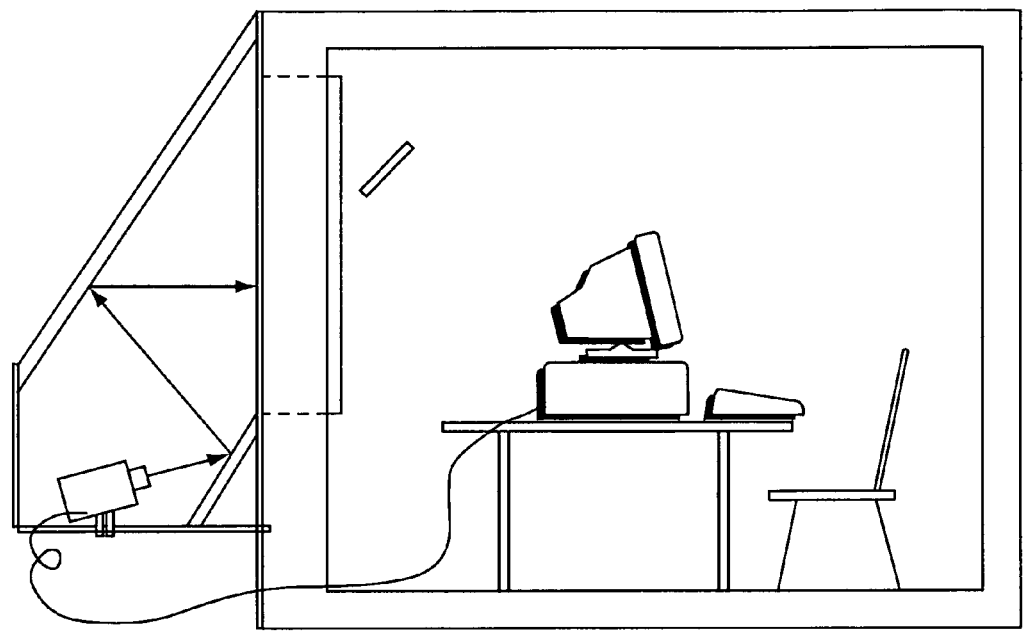
FIG. 4A is a side view of a rear projection mode example.
Figure 4B:
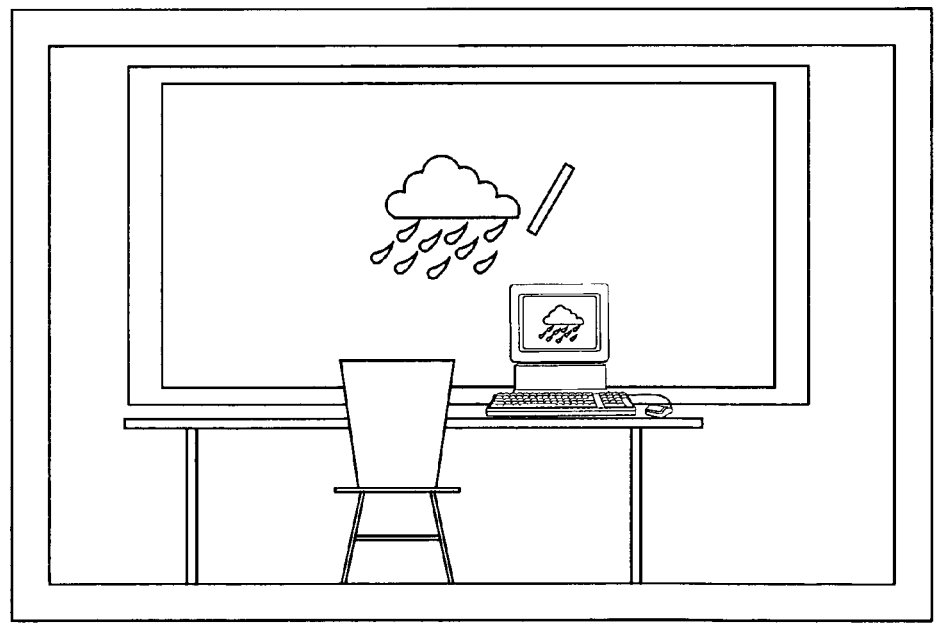
FIG. 4B is a front view of a rear projection mode example.

Similarly, when adopting a rear projection setup as shown in FIGS. 4A and 4B, the projector is located behind a semi-transparent PCP encoded printed surface. When utilizing a rear projection based display setup, it is known in the art of rear projection film projectors and the like project the image via the use of reflecting mirrors. Previously such a system has not been possible when utilizing state of the art interactive display systems due to the requirement for the interaction between the electronic pen and the whiteboard to be controlled via touch based sensing technology which is inherently opaque.

Using the invention in combination with a rear projection setup provides a unique benefit due to the fact that the functionality of an interactive whiteboard display can be utilizing with the added benefit for user experience since the user cannot not interfere with the projected incident light projecting the image onto the screen which is coming usually from a front position projector.

Figure 5A:
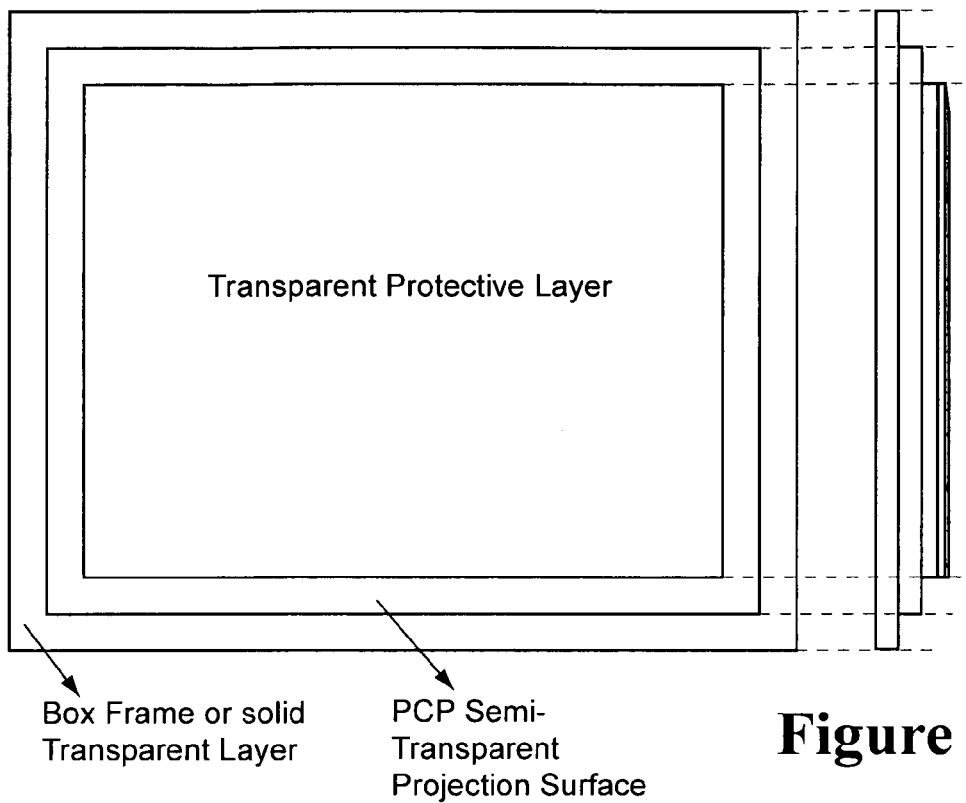
FIG. 5A is a bisection and front perspective view of the projection layer of an example PCP surface used in front projection mode.
Figure 5B:
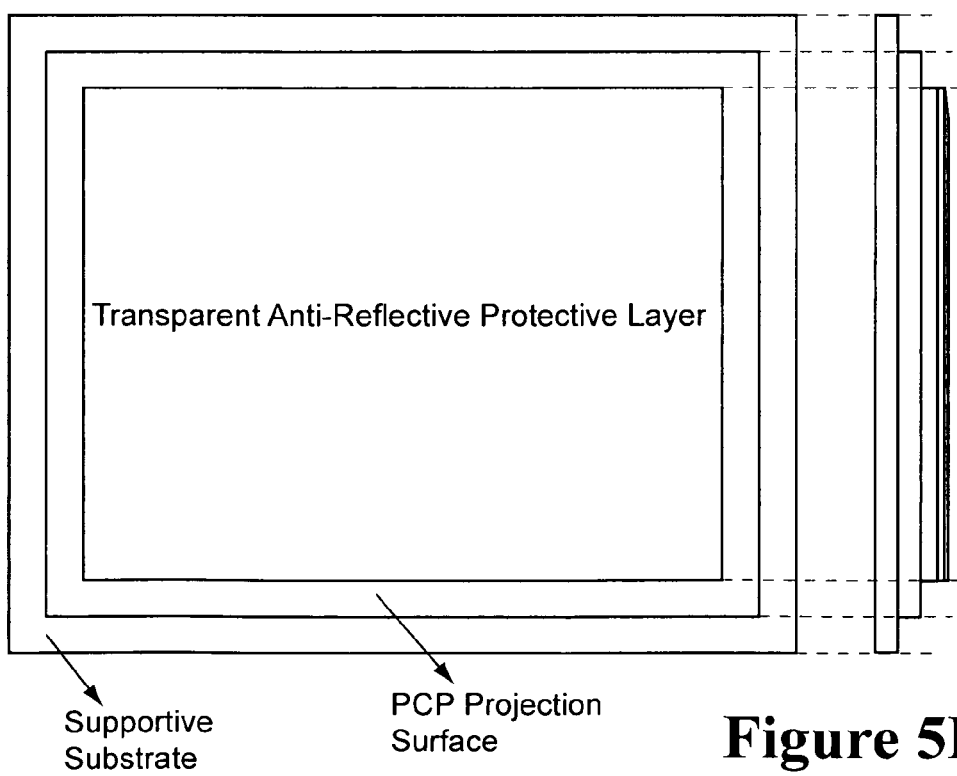
FIG. 5B is both bisection and front perspective of the projection layer of a PCP surface used in rear projection mode.
Figure 6:
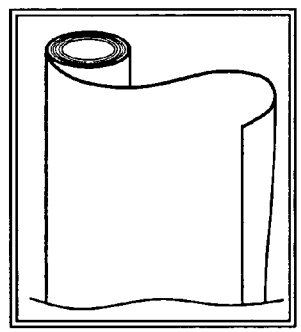
FIG. 6 is sticker roll version of a PCP interactive whiteboard featured in the present invention.
Figure 7:
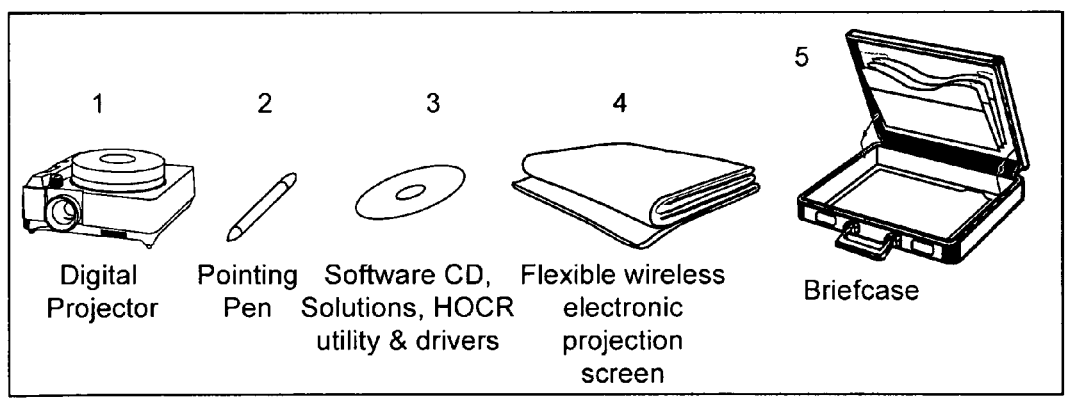
FIG. 7 is a possible packaging configuration of the present invention.

An example of the construction of a PCP surface is shown in FIG. 5B. This diagram illustrates the composition constructed of three layers, the base layer providing a supporting substrate, the middle layer carrying the PCP surface and the top or front layer providing a protective layer for the assembly.

A similar arrangement for a rear PCP surface shown in FIG. 5A, with the distinction being that the supporting substrate may be a perimeter frame or transparent rigid surface with the PCP surface printed onto a semitransparent surface material.

The writing surface may be in the form, but not limited to, a contact paper-like substrate which can be provided with a sticker-like, self-adhesive, or magnetic property on its front or back surface for simple adherence to a surface of choice.

The electronic reading pen tip (i.e. a sensor), can be made pressure sensitive to confirm that the pen tip is actually in touch with the said surface and to therefore initiate the reading, storage and processing of respective (x, y) coordinates from the PCP display surface.

By decoding the position of the pen tip in substantially real time, a moving electronic reading pen tip in touch with the display surface will generate a sequence of (x, y) coordinates indicative of the instantaneous pen tip location on the PCP surface. The read coordinates are thereafter passed in real-time to the host PC, in effect the pen acting as a typical interactive computer mouse.

As such the electronic reading pen can be configured to send control signals such as 'double clicking,' 'right and left clicks,' and such commands can be initiated either from buttons along side the pen body, or alternatively by double click sensing signals being received by and processed by appropriate sensors integrated into the pen tip.

Such commands can therefore be used to control computer applications on the host PC in a manner identical to that associated with the use of a standard computer mouse.

In a further embodiment of the invention, the electronic reading pen may be designed to capture audio inputs and transmit said audio inputs by wired or wireless means to said host PC wherein said audio inputs may be processed and recognized by the host PC as inputs or commands in relation to a computer program such as a word processing application or the like. Accordingly, a user can utilize the electronic reading pen to interact with applications running on a host PC to input words, letters or commands and for said words letters or commands to be displayed on the screen, display means, writing surface and/or other surface or the like being utilized in accordance with the invention. Alternatively, the captured audio inputs may be processed by processor means within or connected to the electronic reading pen and thereafter transmitted to said host PC.

Accordingly such an electronic reading pen might be equipped with a microphone and wireless Internet adapter (e.g., 802.11a/b or WiFi), which would enable the pen, with some particular software installed on it, to transfer spoken voice in real time using the well-known Voice over Internet Protocol (VoIP) technology, without the need for storing the voice in the pen's memory.

Matching calibration of the position coded pattern (PCP) display screen with the actual computer screen scale may be undertaken so that inputs received from the electronic reading pen when the pen's tip is pointing at a specific location on the PCP surface (i.e. say double click on a save button), will be interpreted as a command that matches an action initiated due to pointing on the region of interest on the said computer application screen.

Calibration commands may take place at the intended respective location of the pen tip superimposed on the application being projected on the PCP screen to enable command actions to be executed.

Figure 8:
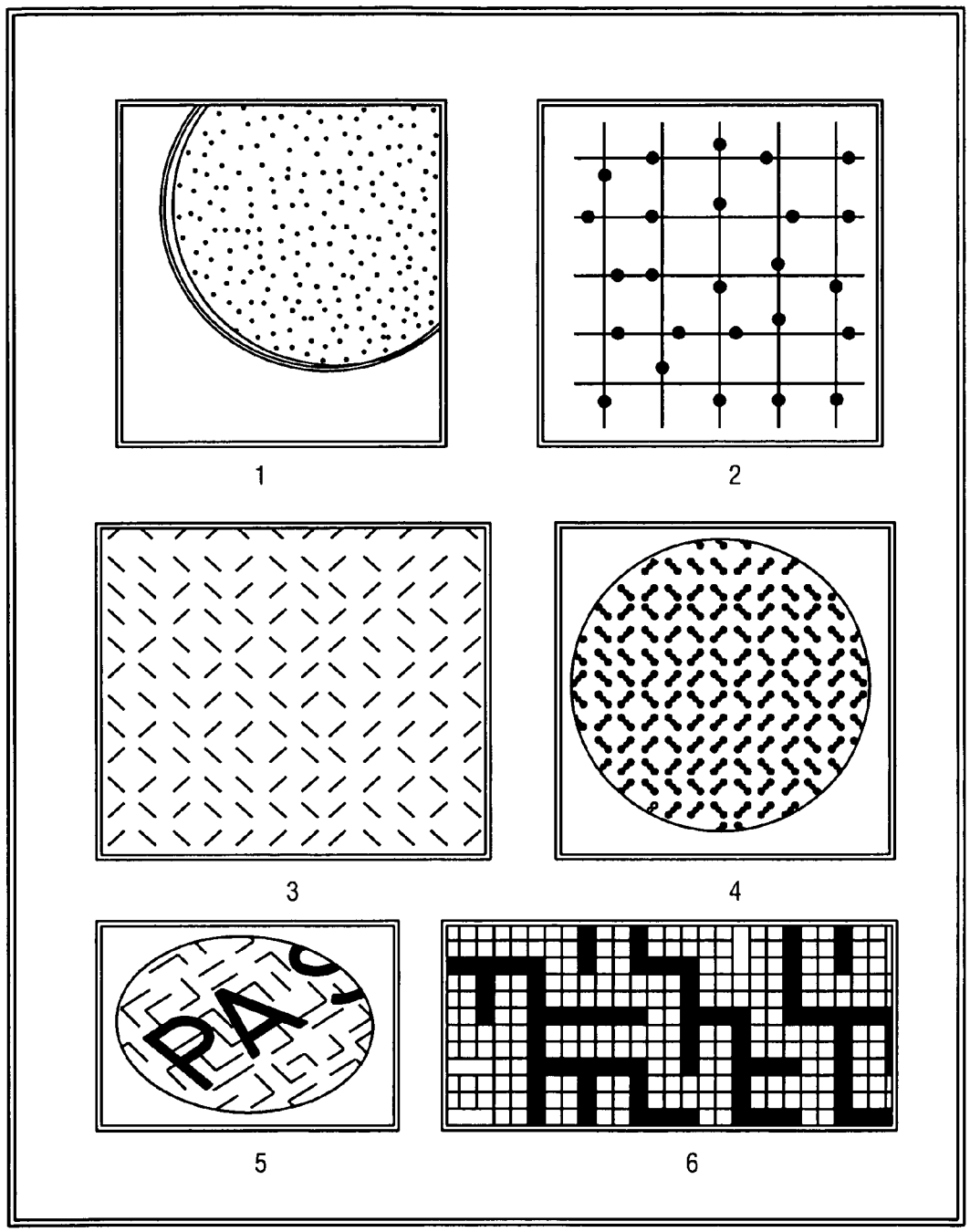
FIG. 8 is a set view of different pattern types that can be utilized in the present invention.
Figure 9A:
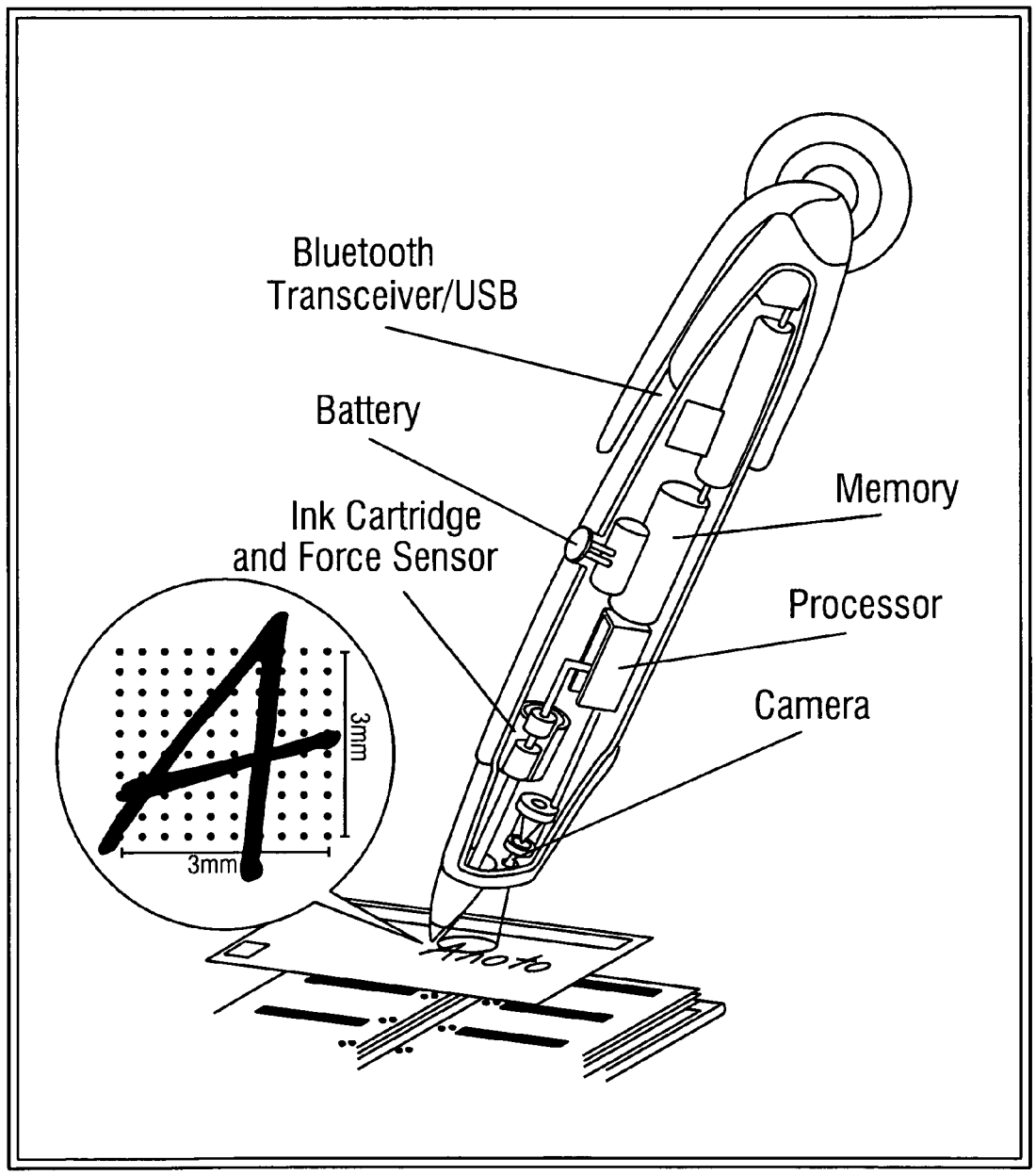
FIG. 9A is a diagram illustrating the main components of an example electronic reading pen.
Figure 9B:
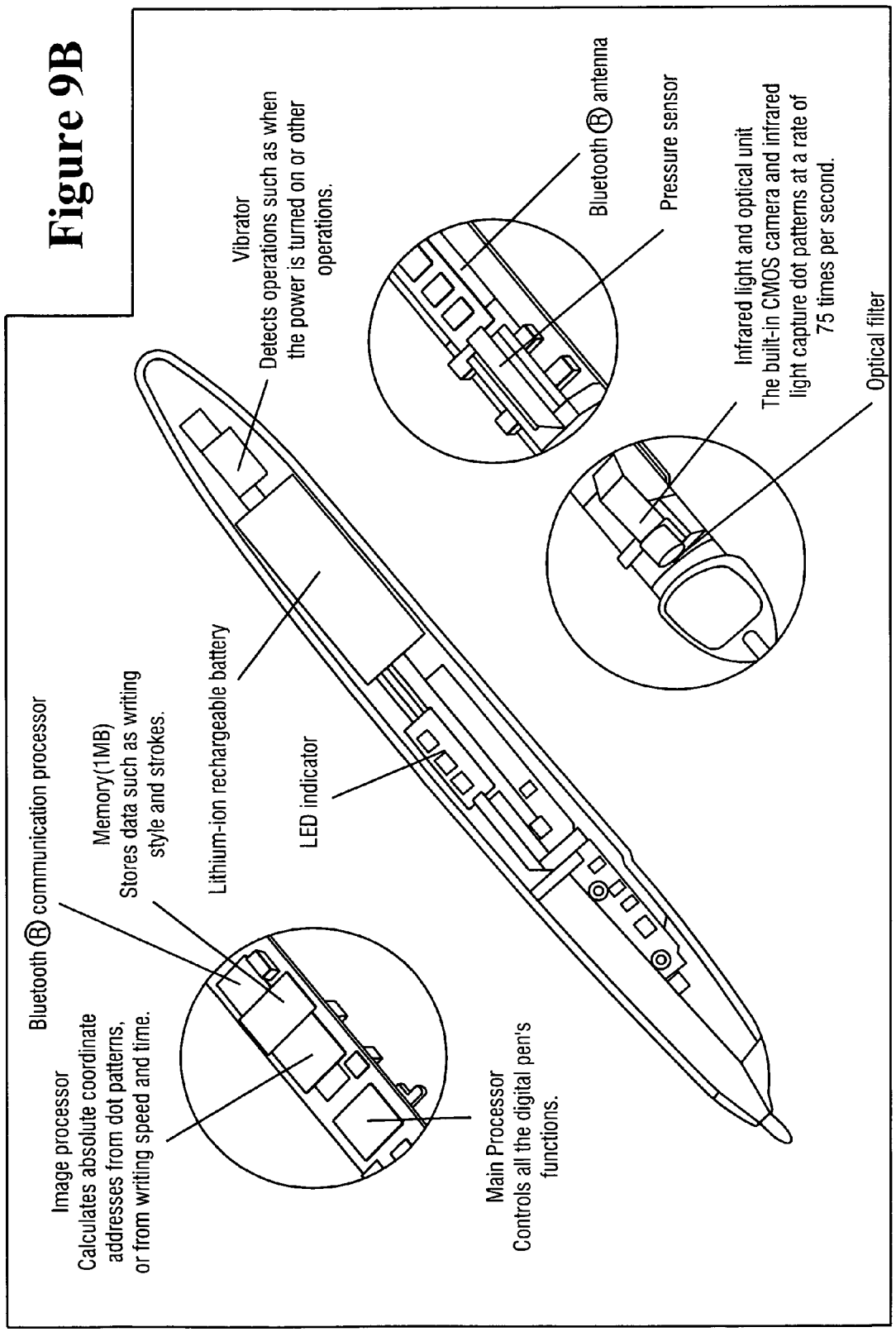
FIG. 9B is an exploded view of the internal anatomy of an example electronic reading pen.

FIG. 8 illustrates example position coding patterns to be printed on the projection surface and FIGS. 9A and 9B illustrate example electronic pens.

In FIG. 8.1, a state of the art PCP may be utilized to practice the present invention. The PCP pattern may be comprised of small dots placed in a pattern that follows a certain algorithmic theme which, when decoded, reveals unique information about absolute position in (x, y) coordinates as shown in FIG. 8.2.

Other PCP patterns capable of being printed or deposited onto any display surface may readily be employed by this invention, including, but not limited to the Xerox data glyph pattern shown at FIGS. 8.3 and 8.4, and other patterns belonging to Microsoft shown at FIGS. 8.5 and 8.6.

Such position coding pattern families typically follow the same principle of having an algorithm that can generate and distribute a pattern in a way that decodes position information over the surface on which the pattern is to be applied or printed.

As to the processes used to decode PCP encoded information, FIG. 9A shows an example of a reading pen produced by Anoto. This electronic reading pen has the function of decoding the encoded position information embedded in an Anoto PCP pattern. To perform this function, the pen comprises two functional principles which in a sense function as the eyes and brain of the pen. The two functions are accomplished through the use of an infrared CCD camera to read the dot pattern of the PCP, and a processor to decode the images being read by this camera.

The decoded (x, y) position information is sent in real-time (i.e. simultaneously whilst being decoded), to a computer via wireless transmission.

FIG. 9B shows a semi exploded view of an example Anoto compatible electronic reading pen, namely the DP-201 R 4.1 streaming pen.

Figure 10A:
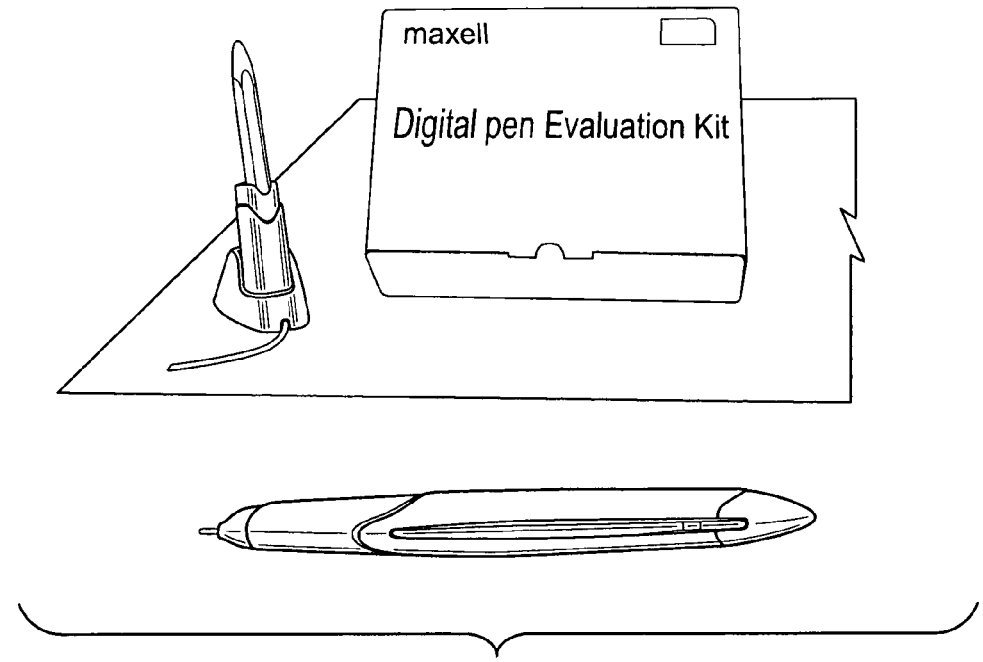
FIG. 10A is an illustration of a digital pen evaluation kit.

FIG. 10A illustrates a similar electronic reading pen, such as those produced by Maxell or Logitech, which supports additional functional components, including a pressure sensitive pen tip, storing memory chip, a vibrator to provide physical shaking feedback to a user, and a Bluetooth antenna for wireless data transmission and reception.

Figure 10B:
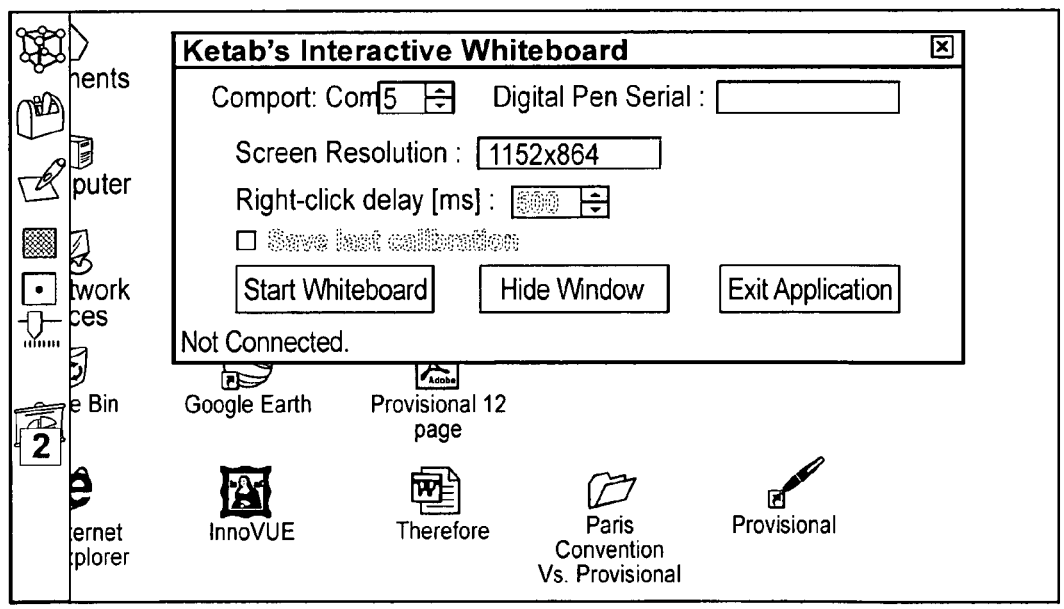
FIG. 10B is a snapshot of a computer desktop showing an example software driver.

In FIG. 10B, the driver software associated with the Maxell DP-201 R4.1 is shown. The example driver software contains a reading port for SPP Bluetooth service to enable connection to the electronic reading pen via Bluetooth (FIG. 10B). In addition, the driver contains a task bar for performing functions such as calibration, onscreen reading and mode switching (FIG. 10B).

Figure 11A:
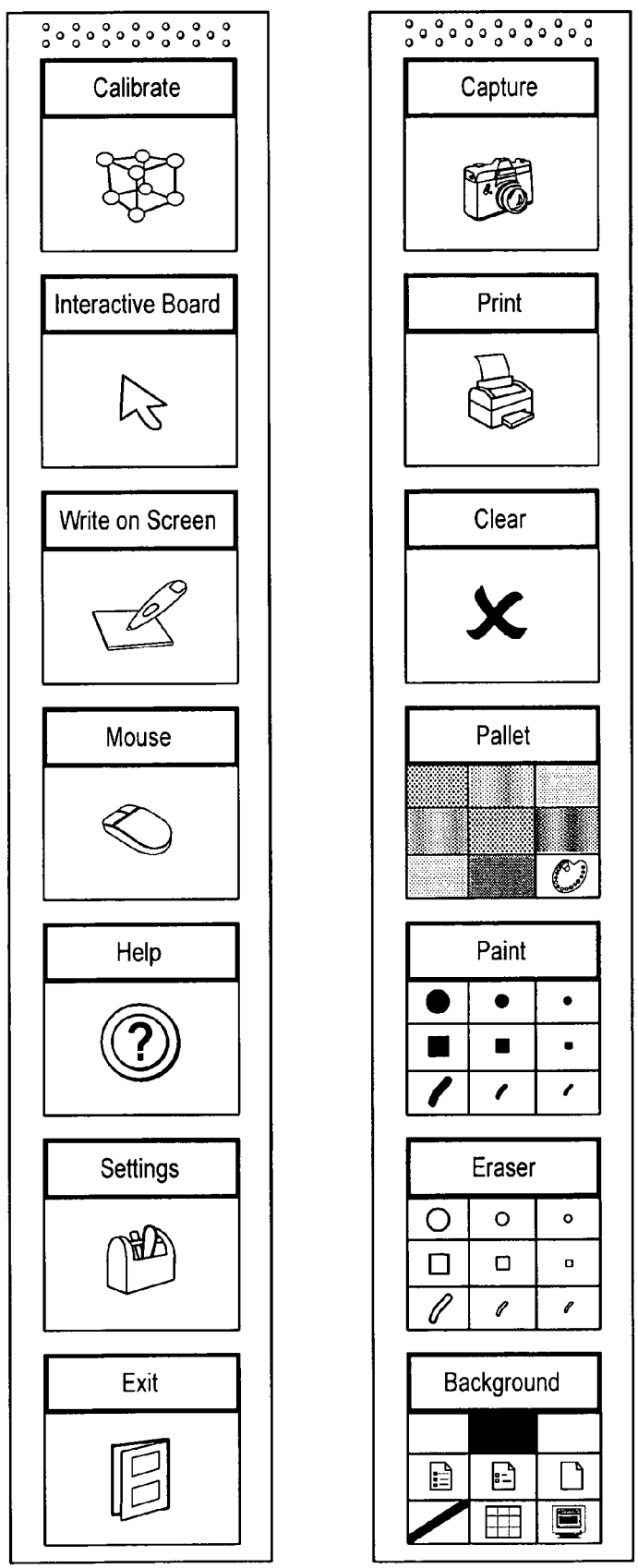
FIG. 11A illustrates an example set of various physical shortcuts.
Figure 11B:
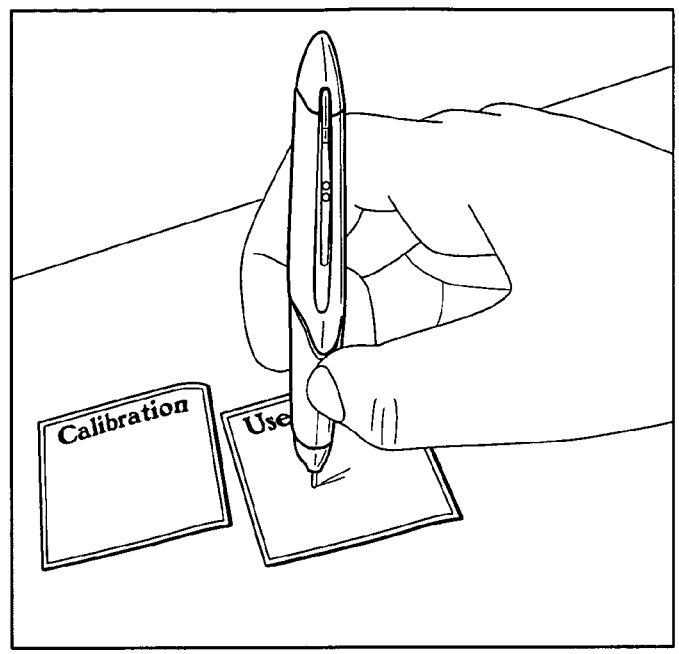
FIG. 11B shows an example pen utilized in conjunction with a physical shortcut.
Figure 11C:
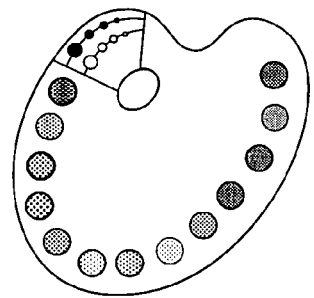
FIG. 11C is an example painting and drawing palette physical shortcut.
Figure 11D:
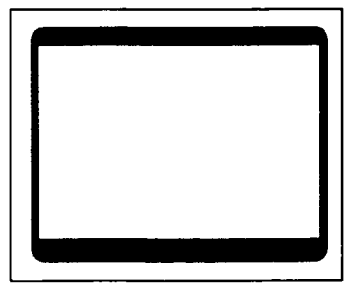
FIG. 11D illustrates a movable PCP mouse pad.
Figure 11E:
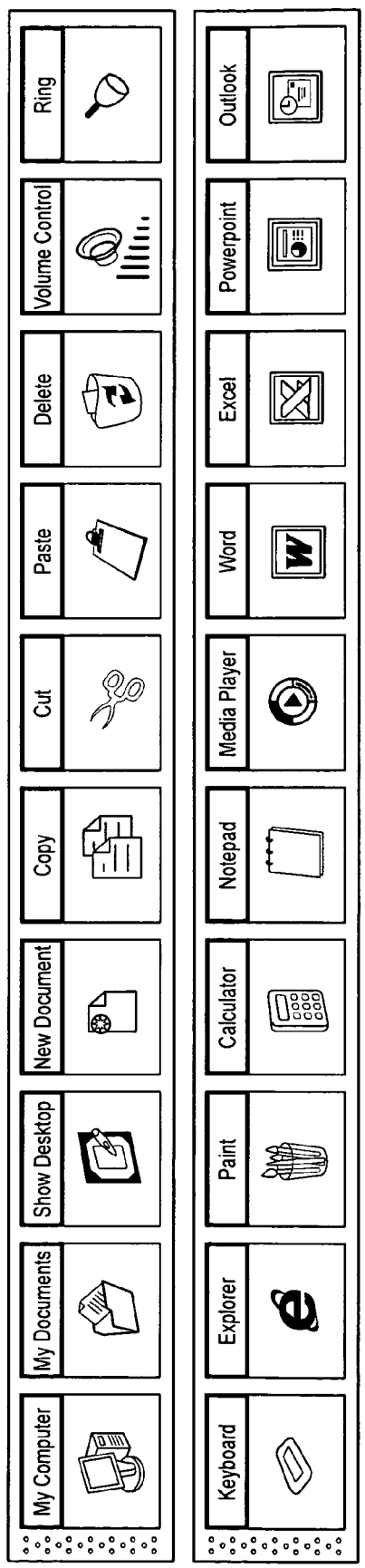
FIG. 11E illustrates an example set of physical shortcuts.

Another embodiment of the present invention is the physical shortcut virtual button shown in FIGS. 11A, 11C and 11D. These are provided by utilizing small areas of PCP printed on paper, or any appropriate surface) with a desired thumbnail picture printed thereon.

The driver software may be configured to recognize specific addresses allocated by programming for these physical shortcuts to linking them to specific functions inside applications or to run whole applications when selected (i.e. by clicking) using the electronic reading pen.

FIG. 11D shows a mouse pad that can be used to remotely control a PC screen projected on a wide PCP surface or any other surface. In FIG. 11C illustrates a color palette designed as a set of physical shortcuts to brush colors in host PC based programs and applications such as Microsoft Paint.

FIG. 9A shows the streaming 'data sending' light flickering on a Maxell DP-201 R4.1 electronic reading pen which indicates that the pen is in action while operating on a physical shortcut defined by a user.

Figure 14A:
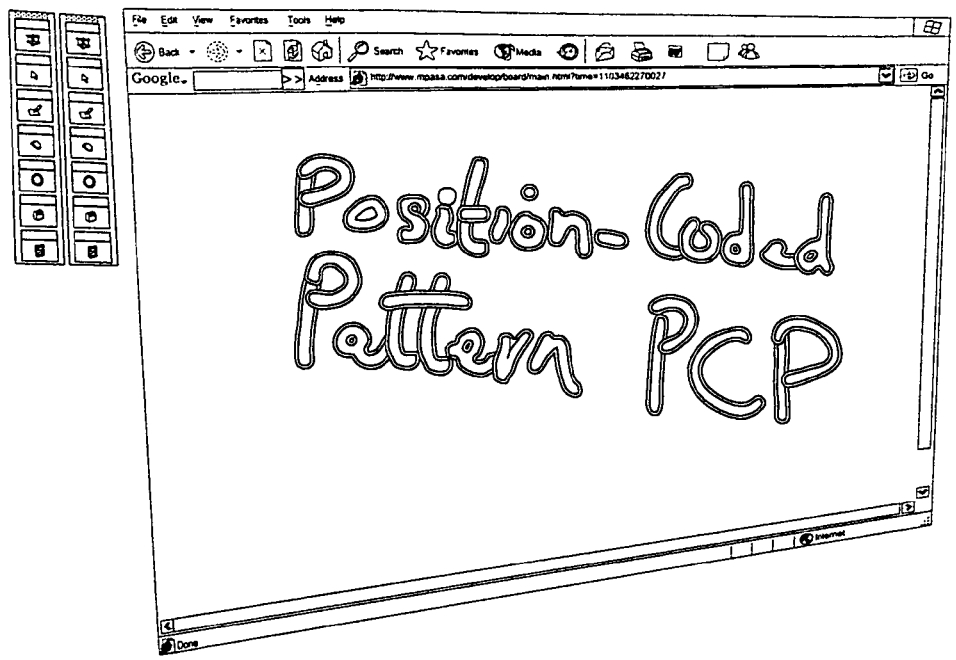
FIG. 14A illustrates an example PCP surface.
Figure 14B:
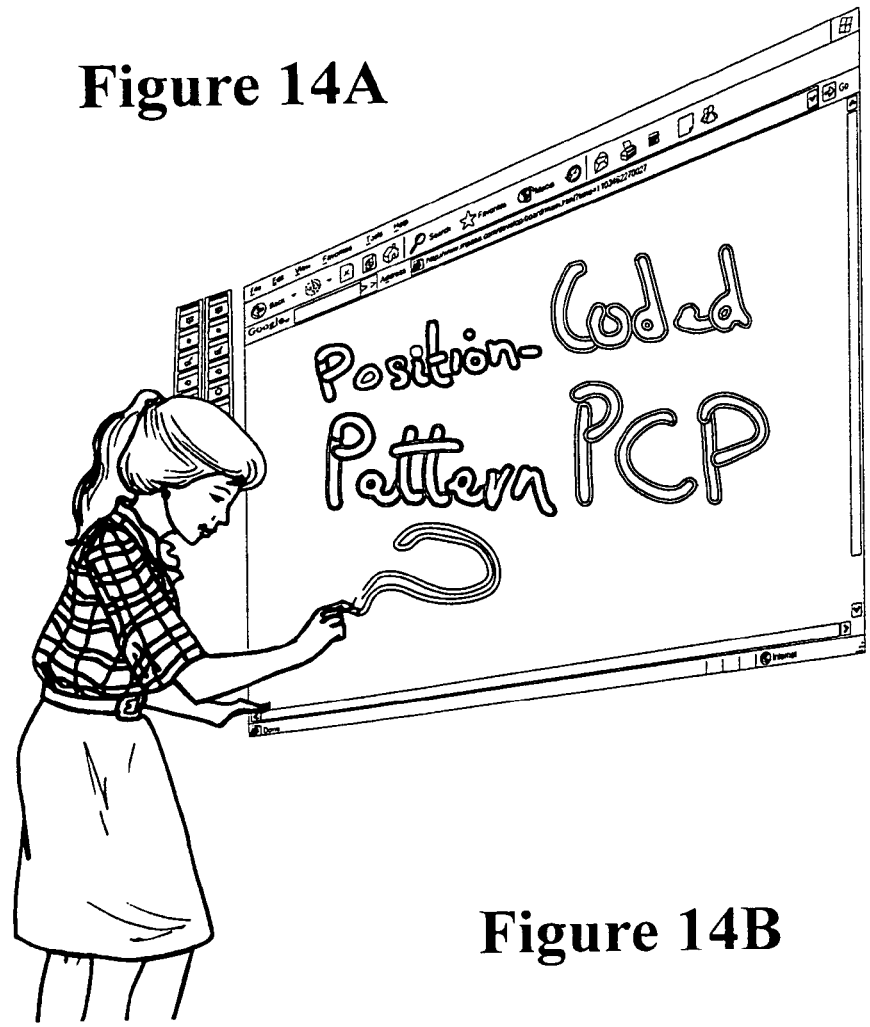
FIG. 14B illustrates a user writing on an example PCP surface with an example electronic pen.

In FIGS. 14A and 14B, an embodiment of the present invention is shown affixed to a wall with the words 'position coded pattern' written with the electronic reading pen on the PCP surface using the program Smart™ Notebook running on the host PC.

Figure 12:
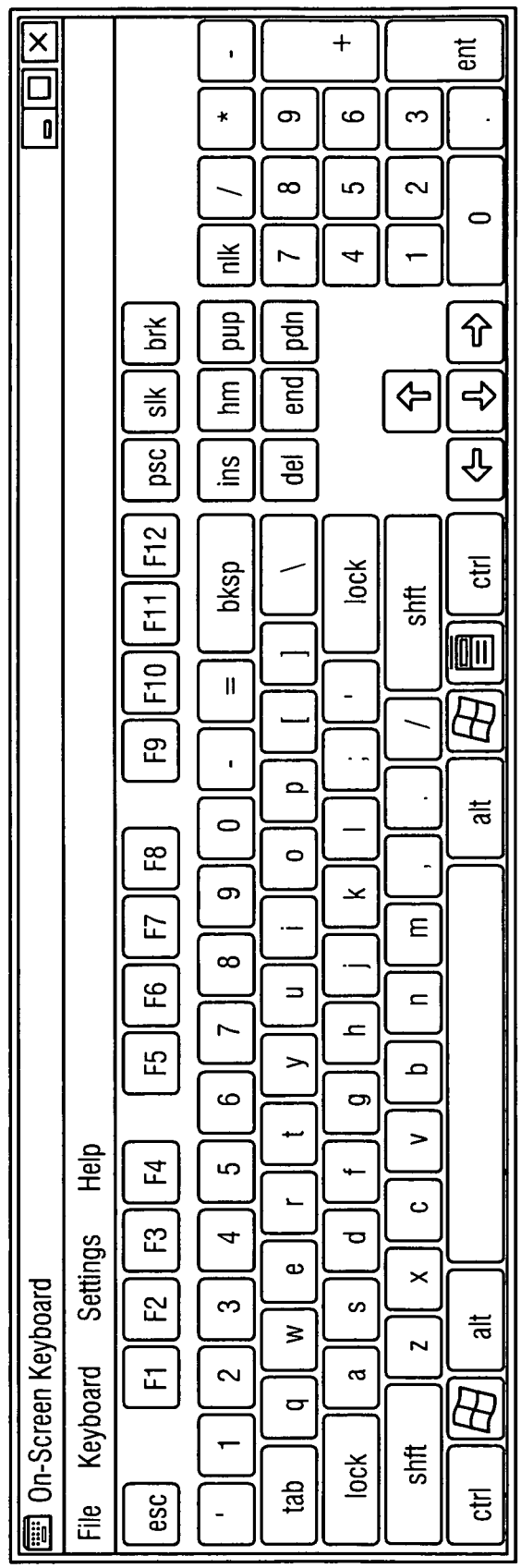
FIG. 12 is an example PCP printed keyboard physical shortcut.
Figure 13A:
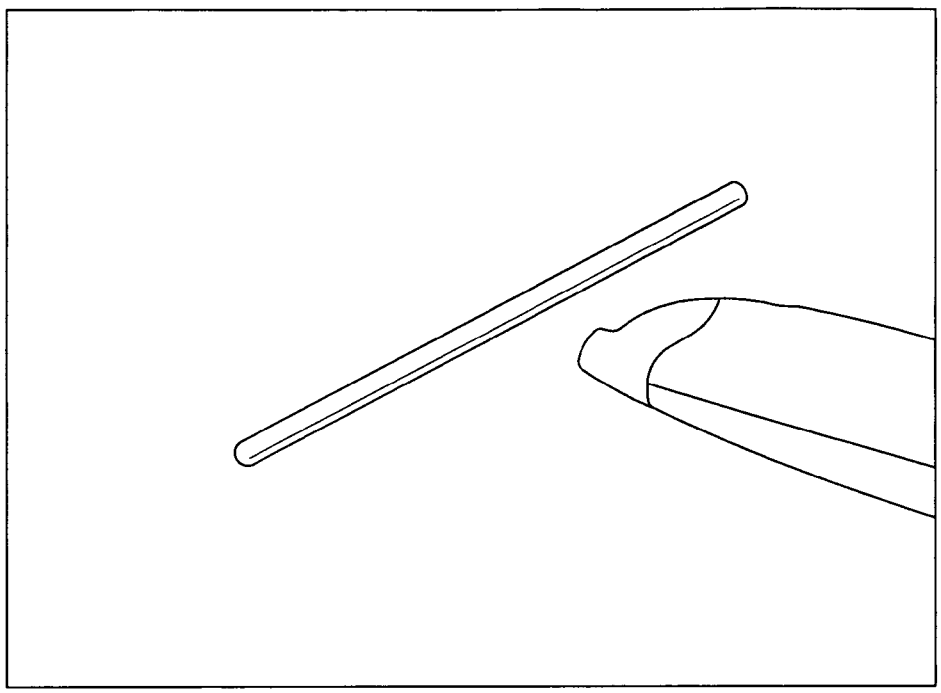
FIG. 13A illustrates an example pen where the stylus head has been removed from the pen nozzle.
Figure 13B:
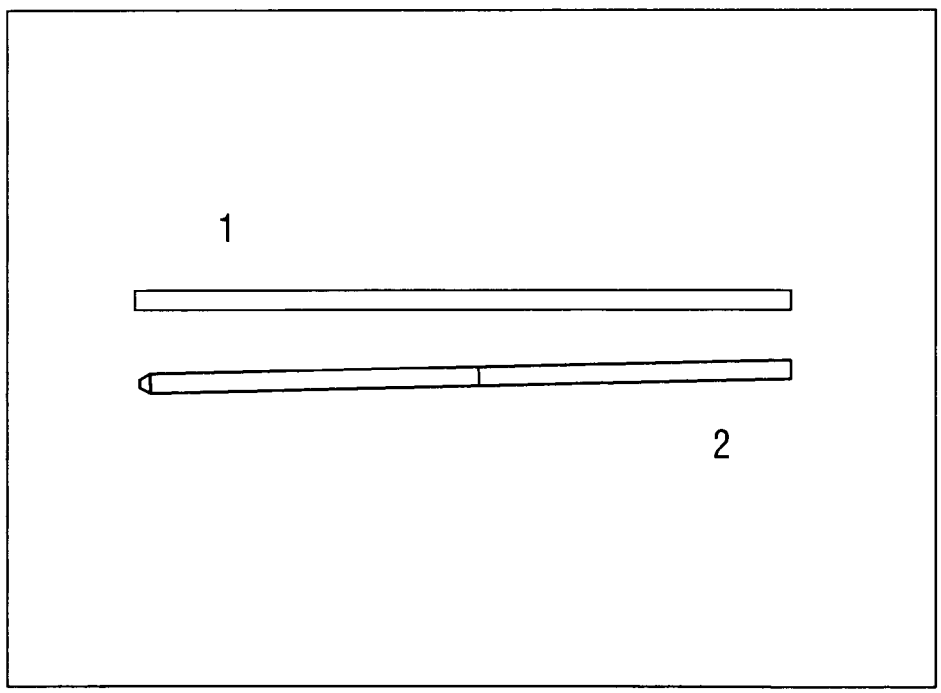
FIG. 13B illustrates a stainless stylus pen head 1 and an ink cartridge ball-point pen head 2.

An additional extension to the concept of physical shortcuts is that relating a real physical entity to cyberspace items by hyper-linking the two. This is illustrated as a printed keyboard shown in FIG. 12.

It will be readily apparent to those skilled in the art that the optimum dimensional relationships for the parts of the invention, to include variations in size, materials, shape, form, function and manner of operation, assembly and use, are deemed readily apparent to one skilled in the art, and all equivalent relationships to those illustrated in the drawings and described in the specification are intended to be encompassed by the present invention.

Therefore, the foregoing description and preferred embodiments should be construed as illustrative only of the principles of the invention. Further, since numerous modifications and changes will readily occur to those skilled in the art, it the invention claimed herein shall not be limited or constrained to the exact construction and operation shown and described, and accordingly, all suitable modifications and equivalents may be resorted to and shall be construed as falling within the scope of the invention.

The invention claimed is:

1. A computer-implemented interactive display method comprising:

providing an interactive display surface having one or more computer generated patterns imprinted thereon, each of the patterns comprising one or more decodable algorithmic themes;

identifying an absolute position of an electronic pen relative to the interactive display surface, the electronic pen having an infrared camera for reading the computer generated patterns upon the interactive display surface and a processor for decoding the patterns read by the infrared camera upon the interactive display surface, wherein the decoded patterns indicate the absolute position of the electronic pen with respect to the interactive display surface;

wherein the interactive display surface comprises a front surface having a magnetic adhesive for releasably attaching the front surface of the interactive display surface to a substantially transparent anti-reflective protective layer;

transmitting, in real time, the absolute position of the electronic pen to a computer system in communication with the electronic pen;

superimposing a visual output of the computer system upon the interactive display surface using one or more rear projectors; and controlling one or more programs running on the computer system using the electronic pen in conjunction with the interactive display surface.

2. The computer-implemented method of claim 1, further comprising:

identifying a scale of the computer system visual output and adjusting the scale of the interactive display surface to substantially match the scale of the computer system visual output.

3. The computer-implemented method of claim 1, wherein the interactive display surface is substantially flexible.

4. The computer-implemented method of claim 1, wherein one or more of the computer generated patterns imprinted on the interactive display surface have a predefined association with a control operation of the computer system such that placing the electronic pen in proximity to the associated generated pattern causes the computer system to automatically execute the associated control operation.

5. The computer-implemented method of claim 4, further comprising:

generating a hyperlink between the computer generated pattern and the associated control operation; and activating the hyperlink to execute the associated control operation.

6. The computer-implemented method of claim 4, wherein the interactive display surface is shaped to resemble a keyboard and wherein the control operation comprises one or more keyboard functions.

7. The computer-implemented method of claim 6, wherein the interactive display surface further comprises one or more thumbnail images, each thumbnail image resembling a keyboard button.

8. The computer-implemented method of claim 4, wherein the interactive display surface is shaped to resemble a mouse pad and wherein the control operation comprises one or more mouse functions.

9. The computer-implemented method of claim 4, wherein the interactive display surface is shaped to resemble a color palette and wherein the control operation comprises one or more color palette functions.

10. An interactive display system comprising:

an interactive display surface having one or more computer generated patterns imprinted thereon, each of the patterns comprising one or more decodable algorithmic themes;

a computer processor operative to:

identify an absolute position of an electronic pen relative to the interactive display surface, the electronic pen having an infrared camera for reading the computer generated patterns upon the interactive display surface and a processor for decoding the patterns read by the infrared camera upon the interactive display surface, wherein the decoded patterns indicate the absolute position of the electronic pen with respect to the interactive display surface;

wherein the interactive display surface comprises a front surface having a magnetic adhesive for releasably attaching the front surface of the interactive display surface to a substantially transparent anti-reflective protective layer;

transmit, in real time, the absolute position of the electronic pen to a computer system in communication with the electronic pen;

superimpose a visual output of the computer system upon the interactive display surface using one or more rear projectors; and control one or more programs running on the computer system using the electronic pen in conjunction with the interactive display surface.

11. A non-transitory computer readable medium for providing an interactive display comprising instructions which, when executed, cause a computing device to:

identify an absolute position of an electronic pen relative to an interactive display surface; the interactive display surface having one or more computer generated patterns imprinted thereon, each of the patterns comprising one or more decodable algorithmic themes; the electronic pen having an infrared camera for reading the computer generated patterns upon the interactive display surface and a processor for decoding the patterns read by the infrared camera upon the interactive display surface, wherein the decoded patterns indicate the absolute position of the electronic pen with respect to the interactive display surface;

wherein the interactive display surface comprises a front surface having a magnetic adhesive for releasably attaching the front surface of the interactive display surface to a substantially transparent anti-reflective protective layer;

transmit, in real time, the absolute position of the electronic pen to a computer system in communication with the electronic pen;

superimpose a visual output of the computer system upon the interactive display surface using one or more rear projectors; and control one or more programs running on the computer system using the electronic pen in conjunction with the interactive display surface.

12. The non-transitory computer readable medium of claim 11, wherein one or more of the computer generated patterns imprinted on the interactive display surface have a predefined association with a control operation of the computer system such that placing the electronic pen in proximity to the associated generated pattern causes the computer system to automatically execute the associated control operation.

13. The non-transitory computer readable medium of claim 12, wherein the instructions, when executed, cause the computing device to generate a hyperlink between the computer generated pattern and the associated control operation and activate the hyperlink to execute the associated control operation.

* * * * *